United States Patent
Zuccaro et al.

(10) Patent No.: US 6,456,659 B1
(45) Date of Patent: Sep. 24, 2002

(54) MOTION ESTIMATOR ALGORITHM AND SYSTEM'S ARCHITECTURE

(75) Inventors: Amedeo Zuccaro, Fosseno di Nebbiuno; Danilo Pau, Sesto San Giovanni; Emiliano Piccinelli, Monza, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/192,973

(22) Filed: Nov. 16, 1998

(30) Foreign Application Priority Data

Nov. 17, 1997 (EP) .............................. 97830605

(51) Int. Cl.[7] .............................. H04N 11/02
(52) U.S. Cl. .................... 375/240.16; 348/699; 348/97; 382/236
(58) Field of Search .................. 348/699, 97; 375/240, 375/240.16; 382/236

(56) References Cited

U.S. PATENT DOCUMENTS

| | | | | |
|---|---|---|---|---|
| 5,627,601 A | * | 11/1994 | Ran .......................... | 348/699 |
| 5,473,378 A | * | 12/1995 | Tamitani ..................... | 348/416 |
| 5,691,771 A | * | 12/1995 | Oishi ......................... | 348/97 |
| 5,594,504 A | * | 6/1997 | Ebrahimi ..................... | 348/416 |
| 5,978,034 A | * | 11/1999 | Hosaka ....................... | 348/416 |
| 6,049,362 A | * | 4/2000 | Butler ........................ | 348/699 |
| 6,132,837 A | * | 10/2000 | Nemiroff et al. ...... | 375/240.12 |
| 6,185,340 B1 | * | 2/2001 | Comer ....................... | 382/236 |
| 6,278,736 B1 | * | 2/2001 | De Haan | |
| 6,324,216 B1 | * | 11/2001 | Igarashi ................ | 375/240.14 |

OTHER PUBLICATIONS

C.H. Hsieh et al., "Motion Estimation Algorithm Using Interblock Correlation," Electronics Letters, vol. 26, No. 5, Mar. 1, 1990, pp. 276–277.

G. de Haan et al., "True–Motion Estimation with 3–D Recursive Search Block Matching," IEEE Transactions on Circuits and Systems for Video Technology, vol. 3, No. 5, Oct. 1, 1993, pp. 368–379.

J. Feng et al., "Adaptive Block Matching Motion Estimation Algorithm For Video Coding," Electronics Letters, vol. 31, No. 18, Aug. 31, 1995, pp. 1542–1543.

S. Zafar et al., "Predictive Block–Matching Motion Estimation Schemes For Video Compression, Part I, Inter–Block Prediction," Proceedings of Southeastcon, Institute of Electrical and Electronics Engineers, vol. 2, Jan. 1, 1991, pp. 1088–1092.

Y. Zhang, et al., "Predictive Block–Matching Motion Estimation Schemes For Video Compression, Part II, Inter–Frame Prediction of Motion Vectors," Proceedings of the Southeastcon, Institute of Electrical and Electronics Engineers, vol. 2, Jan. 1, 1991, pp. 1093–1095.

* cited by examiner

*Primary Examiner*—Chris Kelley
*Assistant Examiner*—Charles Parsons
(74) *Attorney, Agent, or Firm*—Lisa K. Jorgenson; Allen, Dyer, Doppelt, Milbrath & Gilchrist, P.A.

(57) ABSTRACT

A motion estimator operating on a recursive mode reduces the number of operations per pixels required by the particular coding process being implemented. The coding process includes the MPEG standard. A method is based on the correlation existing among motion vectors associated to macroblocks in a common position in temporally adjacent images. The method is also associated to macroblocks belonging to the same picture and spatially adjacent to the current macroblock being processed. By using this double correlation, the calculation burden is reduced.

16 Claims, 9 Drawing Sheets

MOTION ESTIMATOR ALGORITHM AND SYSTEM'S ARCHITECTURE

FIELD OF THE INVENTION

The present invention relates to the field of video processing, and more particularly, to an algorithm and an architecture of a motion estimator for implementing video coders compliant with the MPEG-2 standard.

BACKGROUND OF THE INVENTION

The concept of motion estimation is that a set of pixels of a field of a picture may be placed in a position of the subsequent picture obtained by translating the preceding one. These transpositions of objects may expose to the video camera parts that were not visible before, as well as changes of their shape, e.g., zooming. The family of algorithms that identify and associate these portions of images is generally referred to as motion estimation. Such an association allows calculation of the portion of a different image by removing the redundant temporal information making more effective the subsequent process of compression by transformation, quantization and entropic coding.

Figure 1:
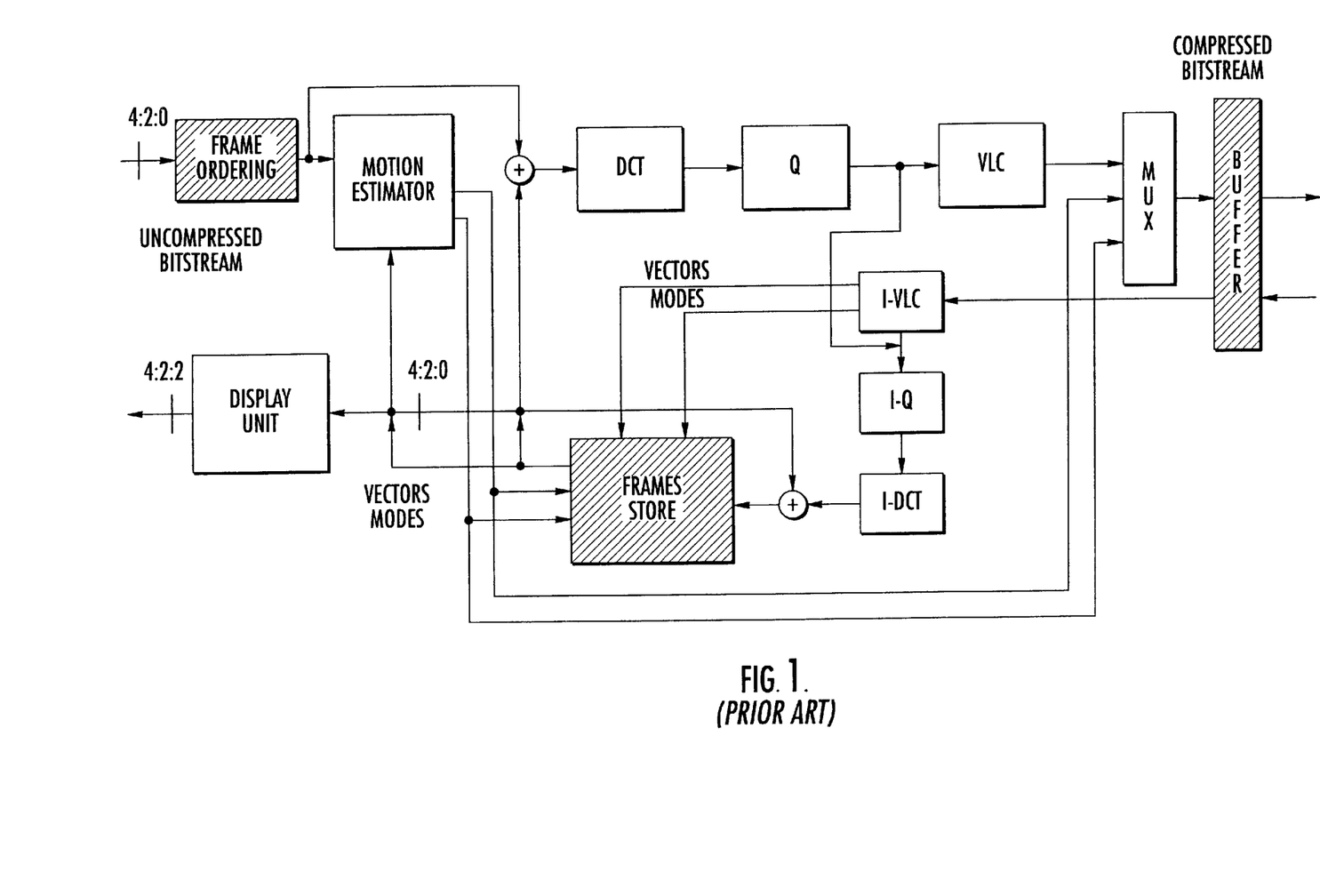
FIG. 1 is a block diagram of a video coder MPEG-2 MPML, according to the prior art.

A typical example of the motion estimation is found in the MPEG-2 standard. A typical block diagram of a video MPEG-2 coder is depicted in FIG. 1. Such a system is made up of the following functional blocks:

1) Field Ordinator. This blocks is composed of one or several field memories outputting the fields in the coding order required by the MPEG standard. For example, if the input sequence is I B B P B B P etc., the output order will be I P B B P B B . . . I is the Intra-coded picture, and is a field and/or a semi-field containing temporal redundancy. P is the Predicted-picture, and is a field and/or semi-field from which the temporal redundancy with respect to the preceding I or P picture (previously coded/decoded) has been removed. B is the Bidirectionally predicted-picture, and is a field and/or a semi-field whose temporal redundancy with respect to the preceding I and subsequent P (or preceding P and successive P) pictures has been removed. In both cases, the I and P pictures must be considered as already coded/decoded.

Each frame buffer in the format 4:2:0 occupies the following memory space:

| | | |
|---|---|---|
| standard PAL | 720 × 576 × 8 for the luminance (Y) = | 3,317,760 bit |
| | 360 × 288 × 8 for the chrominance (U) = | 829,440 bit |
| | 360 × 288 × 8 for the chrominance (V) = | 829,440 bit |
| | total Y + U + V = | 4,976,640 bit |
| standard NTSC | 720 × 480 × 8 for the luminance (Y) = | 2,764,800 bit |
| | 360 × 240 × 8 for the chrominance (U) = | 691,200 bit |
| | 360 × 240 × 8 for the chrominance (V) = | 691,200 bit |
| | total Y + U + V = | 4,147,200 bit |

2) Motion Estimator. This block removes the temporal redundancy from the P and B pictures.

3) DCT. This block implements the discrete cosine transform according to the MPEG-2 standard. The I picture and the error pictures P and B are divided in 8*8 blocks of portions Y, U, V on which the DCT transform is performed.

4) Quantizer (Q). An 8*8 block resulting from the DCT transform is then divided by a quantizing matrix to reduce the magnitude of the DCT coefficients. The information associated with the highest frequencies less visible to human sight tend to be removed. The result is reordered and sent to the successive block.

5) Variable Length Coding (VLC). The coded words output from the quantizer tend to contain a large number of null coefficients, followed by non-null values. The null values preceding the first non-null value are counted. The count figure comprises the first portion of a coded word, the second portion of which represents the non-null coefficients. These paired values tend to assume values more probable than others. The most probable ones are coded with relatively short words (composed of 2, 3 or 4 bits), while the least probable are coded with longer words. Statistically, the number of output bits is less than in the case such methods are not implemented.

6) Multiplexer and Buffer. Data generated by the variable length coder, the quantizing matrices, the motion vectors, and other syntactic elements are assembled for constructing the final syntax considered by the MPEG-2 standard. The resulting bitstream is stored in a memory buffer, the limit size of which is defined by the MPEG-2 standard and cannot be overfilled. The quantizer block Q supports the buffer limit by making the division of the DCT 8*8 blocks dependent upon the filling limit of a memory buffer of the system. The quantizer block Q also supports the buffer limit by making the division of the DCT 8*8 blocks dependent upon the energy of the 8*8 source block taken upstream of the motion estimation and DCT transformation process.

7) Inverse Variable Length Coding (I-VLC). The variable length coding functions specified above are executed in an inverse order.

8) Inverse Quantization (IQ). The words output by the I-VLC block are reordered in the 8*8 block structure, which is multiplied by the same quantizing matrix that was used for its preceding coding.

9) Inverse DCT (I-DCT). The DCT transform function is inverted and applied to the 8*8 block output by the inverse quantization process. A change is made from the domain of spatial frequencies to the pixel domain.

10) Motion Compensation and Storage. At the output of the I-DCT block the following pictures may alternately be present. A decoded I picture or semipicture that must be stored in a respective memory buffer for removing the temporal redundancy with respect to subsequent P and B pictures. A decoded prediction error picture or semipicture P or B that must be summed to the information removed previously during the motion estimation phase. In the case of a P picture, such a resulting sum stored in a dedicated memory buffer is used during the motion estimation process for the successive P pictures and B pictures. These field memories are generally distinct from the field memories used for re-arranging the blocks.

11) Display Unit. This unit converts the pictures from the format 4:2:0 to the format 4:2:2, and generates the interlaced format for displaying the images.

Figure 2A:
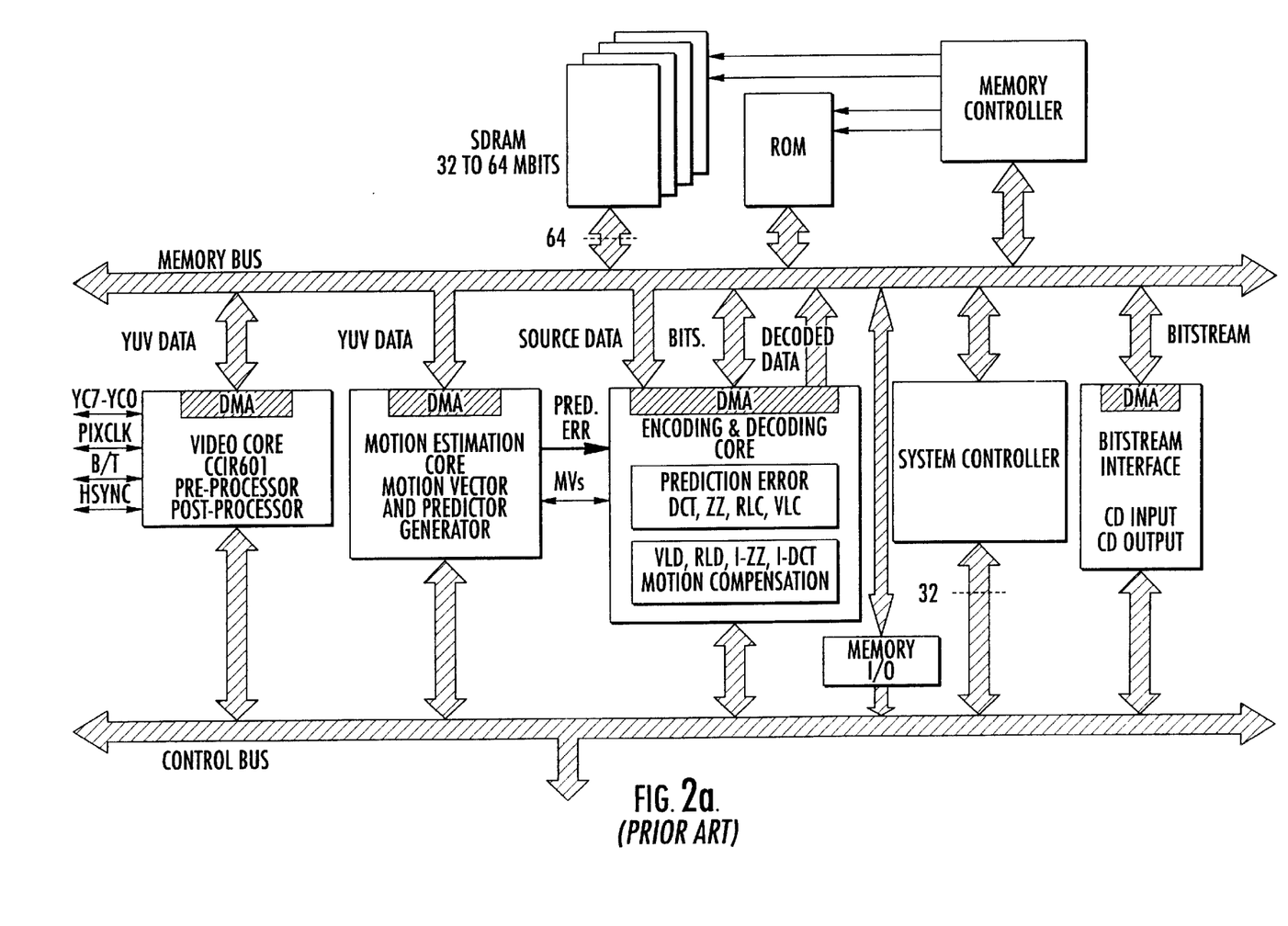
FIG. 2a is a block diagram of the architecture of the video coder MPEG-2 MPML of FIG. 1.

An architecture implementing the above-described coder is shown in FIG. 2a. A distinctive feature is that the field rearrangement block (1), the block (10) for storing the already reconstructed P and I pictures, and the block (6) for storing the bitstream produced by the MPEG-2 coding are integrated in memory devices external to the integrated circuit comprising the core of the coder. The decoder accesses the external memory device through a single interface, suitably managed by an integrated controller.

Furthermore, the preprocessing block converts the received images from the format 4:2:2 to the format 4:2:0 by filtering and sub-sampling the chrominance. The postprocessing block implements a reverse function during the decoding and displaying phase of the images. The coding phase also employs the decoding for generating the reference pictures to make operative the motion estimation. For example, the first I picture is coded, decoded, stored (as described in block description 10), and is used for calculating the prediction error that will be used to code the subsequent P and B pictures. The play-back phase of the data stream previously generated by the coding process uses only the inverse functional blocks (I-VLC, I-Q, I-DCT, etc.), never the direct functional blocks. From this perspective, the coding and the decoding implemented for the subsequent displaying of the images are nonconcurrent processes within the integrated architecture.

A description of the non-exhaustive search motion estimator is provided in the following paragraphs by considering two fields of an image. The following description also applies to semifields of the image. The two fields are Q1 at the instant t, and the subsequent field Q2 at the instant t+T, where T is the field period (1/25 sec. for the PAL standard, 1/30 sec. for the NTSC standard). Q1 and Q2 comprise luminance and chrominance components. Assume that motion estimation is applied only to the most information rich component, such as the luminance. The luminance is represented as a matrix of N lines and M columns. Q1 and Q2 are then divided in portions called macroblocks, each macroblock having R lines and S columns.

The results of the divisions N/R and M/S must be two integer numbers, not necessarily equal to each other. MB2 (i,j) is a macroblock defined as the reference macroblock belonging to the field Q2. A first pixel in the top left part of the field Q2 is at the intersection between the i-th line and the j-th column. The pair (i,j) is characterized by the fact that i and j are integer multiples of R and S, respectively.

Figure 2B:
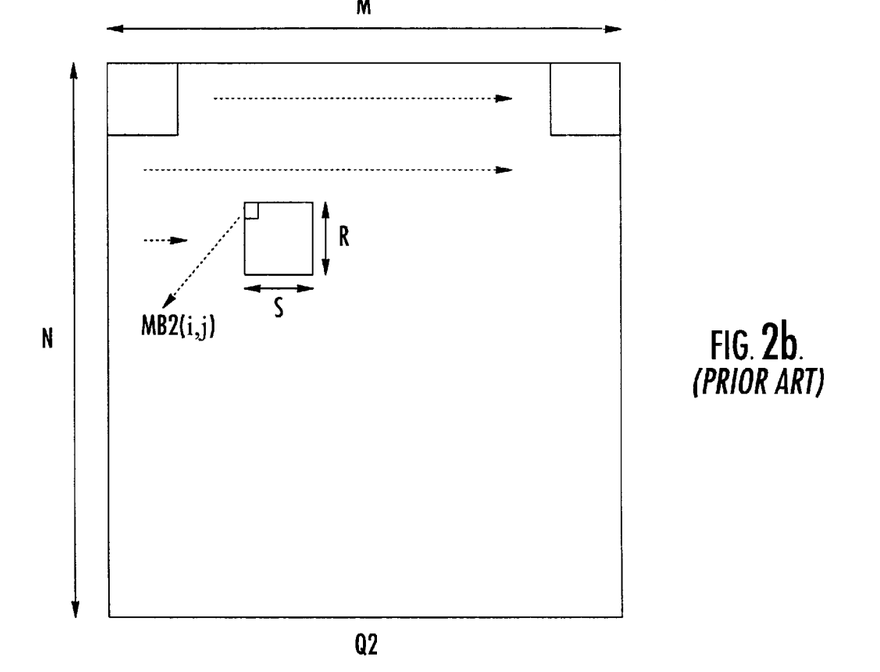
FIG. 2b is a reference scheme of the relative position of the macroblock, according to the prior art.

FIG. 2b shows how the reference macroblock is positioned in the Q2 picture. The horizontal dashed-lines with arrows indicate the scanning order for identifying the various macroblocks on Q2. MB2(i,j) is projected on the field Q1 to obtain MBl(i,j). A search window is defined on Q1 having its center at (i,j), and comprises macroblocks MBk (l,p). K is the macroblock index. The k-th macroblock is identified by the coordinates (e,f), such that:

$$-p \leq (e-i) \leq +p, \quad -q \leq (f, j) \leq +q$$

with e and f being integer numbers.

Each of the macroblocks are said to be a predictor of MB2(i,j). For example, if p=8 and q=16, the number of predictors is (2p+1)*(2q+1)=561. For each predictor, the norm L1 with respect to the reference macroblock is calculated. Such a norm is equal to the sum of the absolute values of the differences between common pixels belonging to MB2(i,j) and to MBk(l,p). Each sum contributes an R*S value, where the result is called distortion. Therefore, (2p+1)*(2q+1) values of distortion are obtained, among from which the minimum value is chosen. This identifies a prevailing position (e*f*).

The motion estimation process is not yet terminated because in the vicinity of the prevailing position, a grid of pixels is created for interpolating those that form Q1. For example, Q1 comprises:

.....................
p31 p32 p33 p34 p35 ....
p41 p42 p43 p44 p45 .....
.....................

After interpolation, the following is obtained:

| ... | | |
|---|---|---|
| p31 | l1 | p32 ... |
| l2 | l3 | l4 ... |
| p41 | l5 | p42 ... |
| ... | | |
| where | l1 = (p31 + p32)/2 | |
| | l2 = (p31 + p41)/2 | |
| | l3 = (p31 + p32 + p41 + p42)/4 | |
| | l4 = (p32 + p42)/2 | |
| | l5 = (p41 + p42)/2 | |

The above noted algorithm is applied in the vicinity of the prevailing position by assuming, for example, p=q=1. In such a case, the number of predictors is equal to 8, and are formed by pixels that are interpolated by starting from the pixels of Q1. The predictor with minimum distortion with respect to MB2(i,j) is then identified. The predictor more similar to MB2(i,j) is identified by the coordinates of the prevailing predictor through the above noted two steps of the algorithm.

The first step tests only whole positions, while the second step tests the sub-pixel positions. The vector comprising difference components between the position of the prevailing predictor and of MB2(j,j) is defined as the motion vector. This describes how MB2(i,j) derives from a translation of a macroblock similar to it in the preceding field. Other measurements may be used for establishing if two macroblocks are similar to each other. For example, the sum of the quadratic values of the differences (norm L2) is one such measurement. Furthermore, the sub-pixel search window may be wider than that specified in the above example. Accordingly, all this further increases the complexity of the motion estimator.

In the example described above, the number of executed operations per pixel is equal to 561+8=569, wherein each operation includes a difference between two pixels, plus an absolute value identification, plus a storage of the calculated result between the pair of preceding pixels of the same macroblock. This means that for identifying the optimum predictor 569*R*S, parallel operators are required at the pixel frequency of 13.5 MHZ. By assuming R=S=16, as defined by the MPEG-2 standard, the number of operations required is 569*16*16=145,664.

Figure 3A:
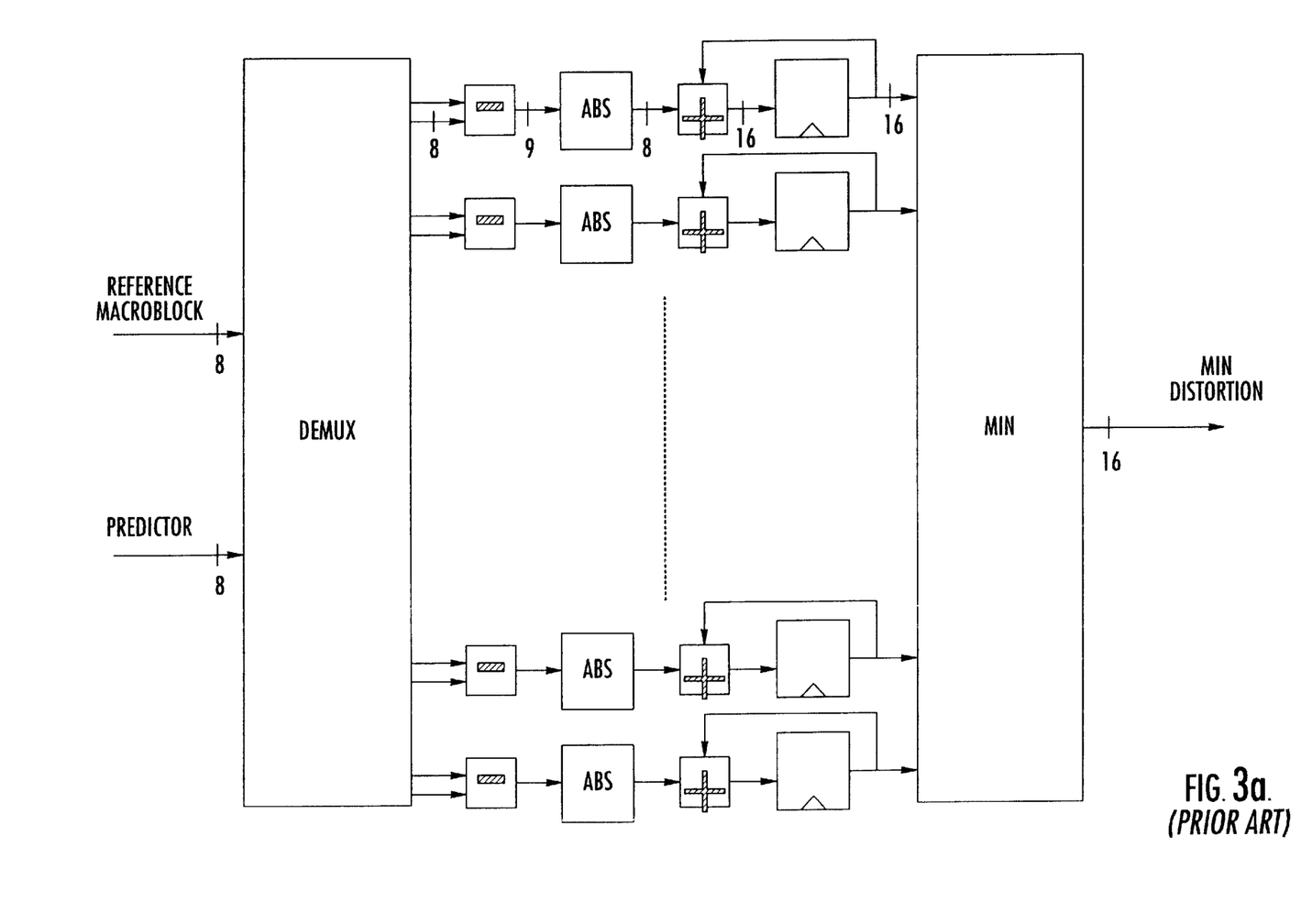
FIG. 3a is a block diagram of the motion estimator showing the operators that perform the calculation of the norm Li, according to the prior art.

Each operator may function on a time division basis on pixels belonging to different predictors. Therefore, if each operator operates at a frequency of 4*13.5=54 MHZ, the number of operators required would be 145,664/4=36,416. A high level block diagram of a prior art motion estimator based on an exhaustive search technique is shown in FIG. 3a. The DEMUX block conveys the data provided by the field memory to the operators, and the MIN block operates on the set of distortion values.

SUMMARY OF THE INVENTION

The object of the present invention is to reduce the complexity of a motion estimator, as used in an MPEG-2 video coder. As an illustration of an efficient implementation of the method and architecture of the motion estimator of the present invention, a coder for the MPEG-2 standard is considered.

Using the motion estimator of the invention, it is possible, for example, to use only 6.5 operations per pixel to find the best predictor of the portion of picture currently being subjected to motion estimation. This is applicable to an SPML compressed video sequence of either the PAL or NTSC type. In contrast, the best result that may be obtained with a motion estimator of the prior art would imply the execution of 569 operations per pixel. This is in addition to the drawback of requiring a more complex architecture.

The method of the invention implies a slight loss of quality of the reconstructed video images for the same compression ratio. However, such a degradation of the images is practically undetectable to human sight because the artifacts are distributed in regions of the images having a substantial motion content. The details of which practically pass unnoticed by the viewer.

BRIEF DESCRIPTION OF THE DRAWINGS

The different aspects and advantages of the invention will become even more evident through the following description of an embodiment, and by referring to the attached drawings, wherein.

DETAILED DESCRIPTION OF THE PREFERRED EMBODIMENTS

A description of a recursive motion estimator according to the present invention is first described in the following paragraphs. This discussion is followed by a description of the architecture of the recursive motion estimator The number of operations per pixels required by the coding process may be reduced once the use of vectors calculated by the motion estimation process for the macroblocks are admitted. The vectors are calculated spatially and temporally in the vicinity of the current macroblock. The method disclosed herein is based on the correlation that exists among motion vectors associated to macroblocks in a common position in temporally adjacent images. Furthermore, the motion vectors associated to macroblocks belonging to the same picture that is spatially adjacent to the current one may represent the motion of the current macroblock. This representation may include small errors.

The process of motion estimation of the invention meets the following requirements. The integration of the required number of operators necessary for implementing the method of motion estimation, together with auxiliary structures, must be considerably less demanding than that of motion estimators that do not use the method of the invention. Auxiliary structures include buffer memories for allowing the reuse of precalculated vectors. The loss of quality of the reconstructed images for a given compression ratio must be practically negligible, as compared to motion estimators that do not implement the method of the invention.

In the ensuing description of the method of motion estimation, reference is made to the same pictures Q1 and Q2 identified in the above description of the prior art method for motion estimation by exhaustive search. In particular, the picture Q1 is subjected to motion estimation with respect to the preceding picture (Q0). Therefore, associated with the picture Q1 is a motion field consisting of a vector per each macroblock. Also assumed is that the motion estimation is searching in the picture Q1 for the best predictor of the macroblock MB2(i,j). All the macroblocks of Q2 that precede the current macroblock are assumed to have already been subjected to such a process.

Figure 3B:
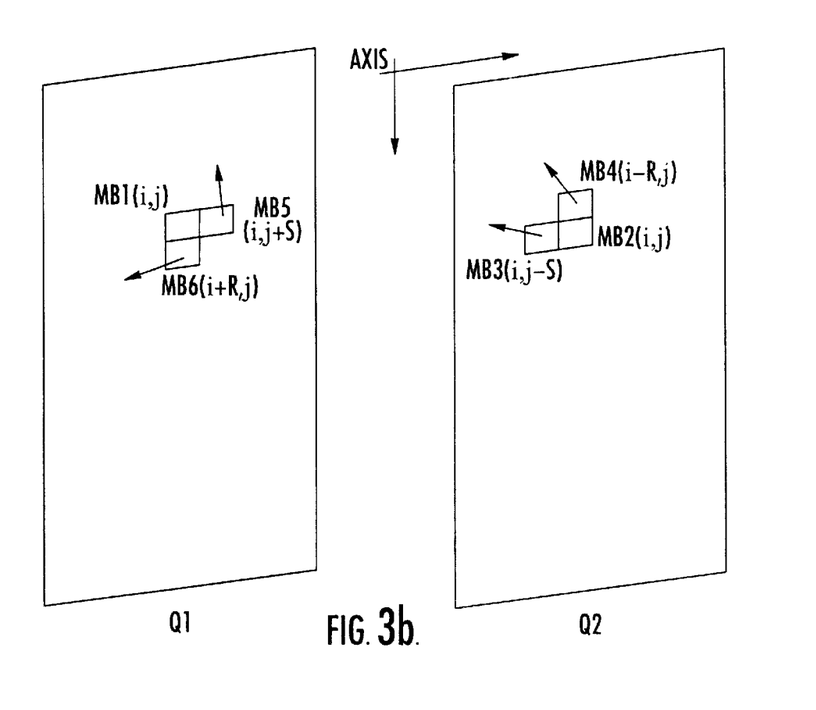
FIG. 3b is a reference scheme of the relative position of the macroblock of pixels taken into consideration in an example calculation, according to the present invention.

According to FIG. 3b, the following vectors are identified. Vector mv_MB5(i,j+S) is the motion vector associated to the macroblock belonging to Q1, and is identified by the coordinates (i,j+S). Vector mv_MB6(i+R,j) is the motion vector associated to the macroblock belonging to Q1, and is identified by the coordinates (i+R,j). Vector mv_MB3(i,j−S) is the motion vector associated to the macroblock belonging to Q2, and is identified by the coordinates (i,j−S). Vector mv_MB4(i−R,j) is the motion vector associated to the macroblock belonging to Q2, and is identified by the coordinates (i−R,j).

By way of example, the above vectors are used for identifying during a first step four predictors starting from the projection of MB2 on Q1. The prevailing predictor is identified by using the norm L1, or the norm L2, etc. Generally, it is possible to use more than two predictors belonging to Q1, and also in a different number from those belonging to Q2. The above noted example has proven itself very effective during simulation.

The norm associated to the prevailing predictor is thereafter compared with precalculated thresholds derived from statistical considerations. Such thresholds identify three subsets, each subset is composed of F pairs of vectors. Each pair, for example, is composed of vectors having components equal in terms of absolute value but opposite in sign. In the second step, the F pairs are summed to the vector that represents the prevailing predictor. This identifies other 2*F predictors, among which there may also be sub-pixel positions.

The prevailing predictor in the sense of the norm is the predictor to be subtracted from MB2(i,j). In such a method, the norm is calculated starting from the result obtained by subsampling the macroblock. This is done according to a quincux scheme, or by interpolating the pixels of Q1 for generating predictor macroblocks disposed in sub-pixels positions of Q1. The quincux grid is obtained by eliminating a pixel every two from the macroblock, according to the following scheme:

| source macroblock | subsampled macroblock | | |
|---|---|---|---|
| A1 A2 A3 A4 A5 A6 . . . | A1 | A3 | A5 |
| B1 B2 B3 B4 B5 B6 . . . | B2 | B4 | B6 |
| C1 C2 C3 C4 C5 C6 . . . | C1 | C3 | C5 |

In this way, the operations necessary for calculating the norm are reduced by 50% as compared to the case of an exhaustive search technique of the prior art motion estimator. An example method used for interpolating the pixels of Q1, which generates the sub-pixels, is the one used in the exhaustive search estimator of the prior art.

Finally, between the macroblock of Q2 with coordinates (e,f)=(0,0) and the prevailing predictor, a final predictor will be defined. For example, the number of operations per pixel according to the above described method is equal to:

| | |
|---|---|
| first step | 4 |
| second step with F = 4 | 8 |
| coordinate position (i-0, j-0) | 1 |
| partial total | 13 (without quincux subsampling) |
| final total | 6.5 (with quincux subsampling) |

In these conditions, performance in terms of a signal/noise ratio obtained is equivalent to that of the known exhaustive search estimator previously described, while the complexity of the hardware implementation is markedly reduced.

Figure 4:
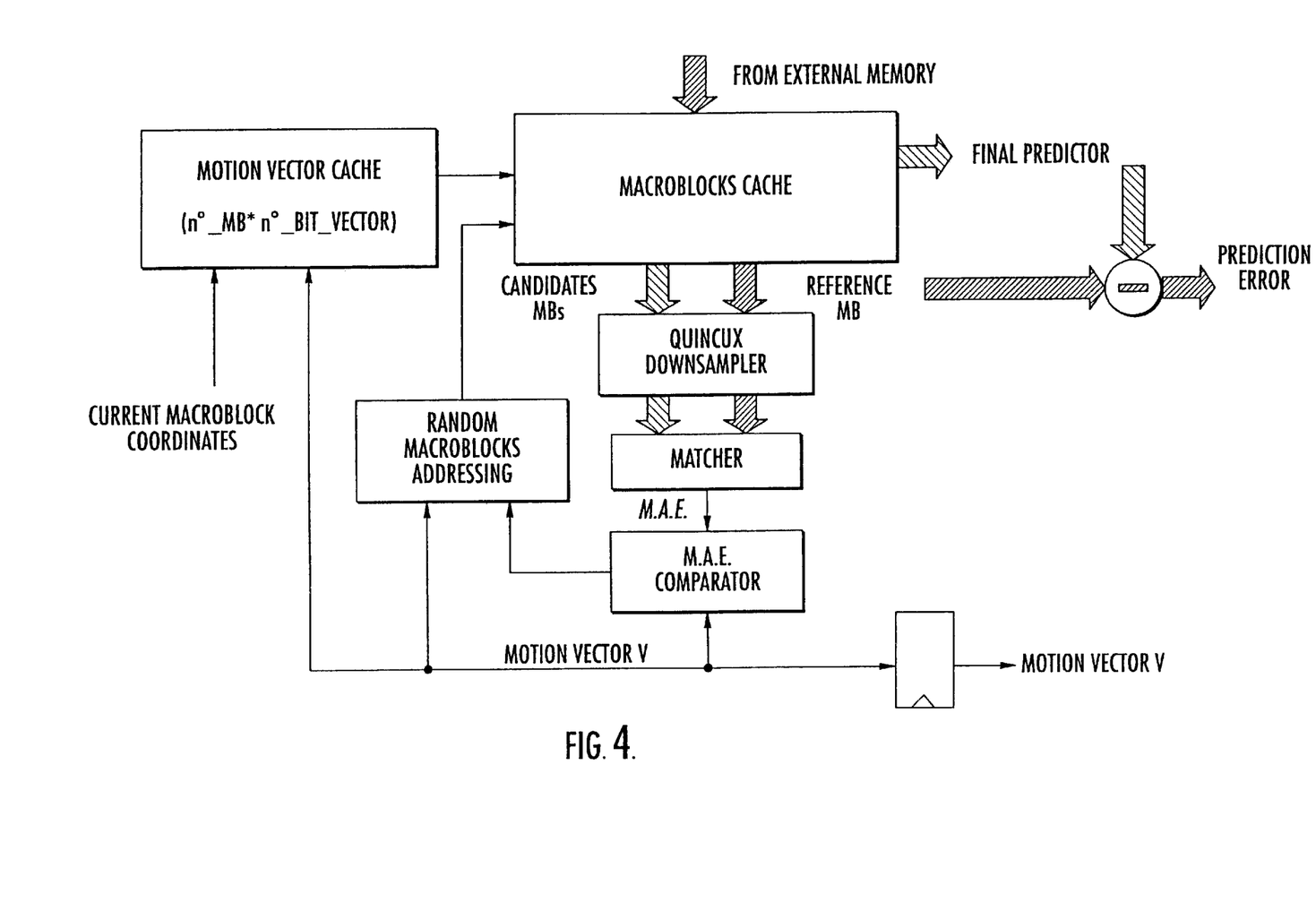
FIG. 4 is a block diagram of the architecture of a recursive motion estimator, according to the present invention.

A block diagram of the recursive motion estimator of the invention is illustrated in FIG. 4. In particular, a memory of (N*M)/(R*S) cells is present, each cell having T bits. The memory contains the motion vectors associated to the macroblocks preceding the current one, and disposed on the same field Q2 and on the preceding field Q1. Furthermore, a memory for storing the predictors belonging to Q1 is also present. This memory has dimensions G*H*R*S*8, and limits the number of accesses to the external memory. Accessing the external memory would otherwise be required every time a predictor is needed for feeding the motion estimator, thus incrementing the passband.

By referring again to the same example described above, the four motion vectors are:

mv_MB5(i,j+S)
mv_MB6(i+R,j)
mv_MB3(i,j−S)
mv_MB4(i−R,j)

Depending on the position (i,j) of the macroblock being subjected to motion estimation, and the reference macroblock, the motion vectors are acquired by the block "memory of the motion vectors". The motion vectors are used for addressing the macroblock memory, from which the four macroblocks feed one at a time the quincux subsampling block. These subsampled macroblocks, eventually interpolated for defining the sub-pixel position, feed the block that calculated the norm L1 (or L2, etc.) between the predictor and the reference predictor. The norm, by identifying the prevailing predictor of step 1 of the processing as discussed above, allows the M.A.E. comparator to address the ROM. Vectors to be summed to the one associated to the prevailing predictor are stored in the ROM.

The ROM is obtained in the block called "random addressing of macroblocks". The output of this block provides the addresses used for singling out the predictors in the "macroblocks memory". These predictors feed the same blocks described in relation to step 1. At the end of step 2 as discussed above, the motion vector V is obtained, and is stored in a register and made available to the coding process.

Figure 6:
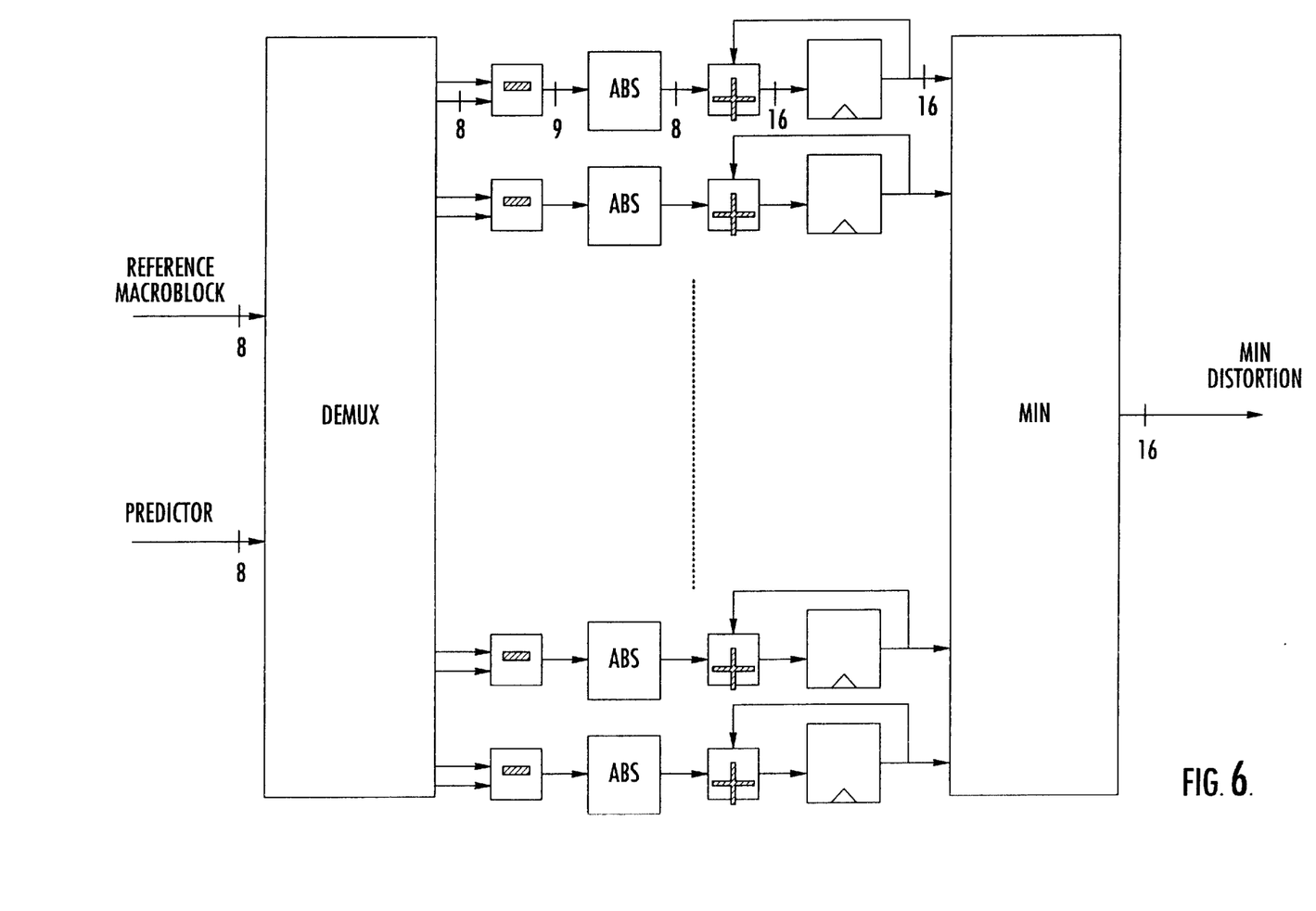
FIG. 6 shows the diagram of the calculator of the norm L1 among predictors, and the reference macroblock, according to the present invention.

Finally, the predictor and the reference macroblock feed a subtractor, the final output of which is the prediction error that feeds the following MPEG-2 compression processing. By observing the diagrams of FIG. 3a and FIG. 6, the number of operators functioning in parallel is less in the case of this invention. FIGS. 3a and 6 respectively show the norm L1 calculators, according to the prior art technique and according to the present invention. In practice, the implementation of FIG. 6 is simpler than that of FIG. 3a.

Figure 5:
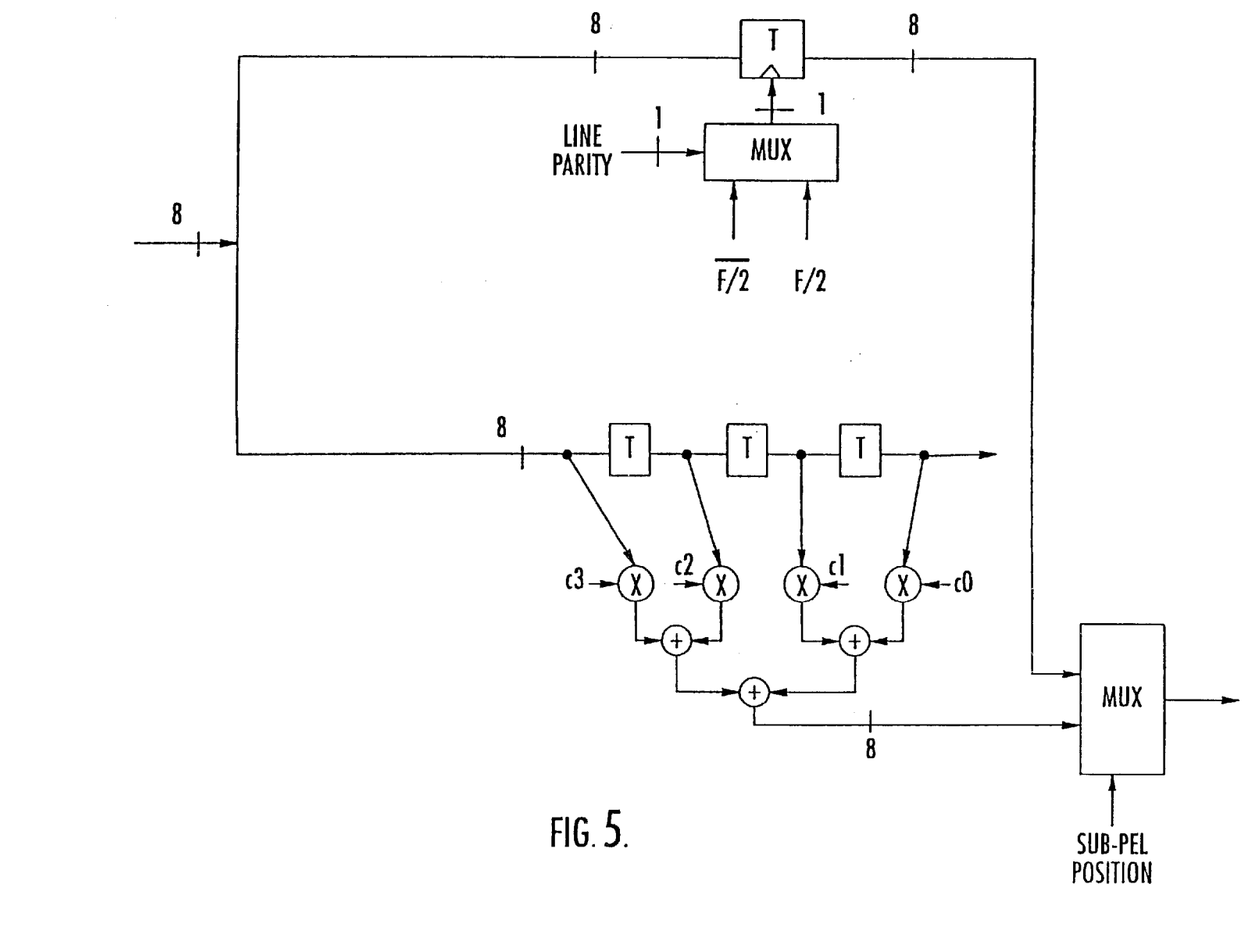
FIG. 5 is a diagram of a quincux subsampler and interpolator, according to the present invention.

With reference to the scheme of FIG. 5, the quincux subsampler is formed by a plurality of 8-bit registers controlled by a multiplexer (mux), i.e., by two signals having the same frequency but opposite phase. The interpolator comprises a plurality of T registers which allow access to the sampled pixels at different instants. This makes them available for the downstream blocks of multiplication and addition. The coefficients C0, C1, C2, C3 may, for example, take the following values if applied to the source pixels p31, p32, p41, p42:

| p31 | p32 | p41 | p42 | | |
|---|---|---|---|---|---|
| ½ | ½ | 0 | 0 | ... | I1 |
| ½ | 0 | ½ | 0 | ... | I2 |
| 0 | 0 | ½ | ½ | ... | I5 |
| 0 | ½ | 0 | ½ | ... | I4 |
| ¼ | ¼ | ¼ | ¼ | ... | I3 |
| 0 | 0 | 0 | 0 | ... | Quincux subsampling implementation |

The multiplexer selects the output depending on the type of predictor required. With reference to the diagram of FIG. 6, the circuit for calculation of the norm L1 among predictors and the reference macroblock comprises a demultiplexer. The demultiplexer conveys the predictors and the reference-macroblock toward the appropriate operator. For example, if the macroblock has a 16*16 size, the precision at the output of the subtractor block may be defined in 9 bits. This is performed by defining the norm L1 as the sum of the absolute values of the differences between common pixels (predictor/reference). The precision of the absolute value block is performed in 8 bits, and the precision of the accumulation block is performed in 16 bits. The latter is formed by an adder and a 16-bit register.

Figure 7:
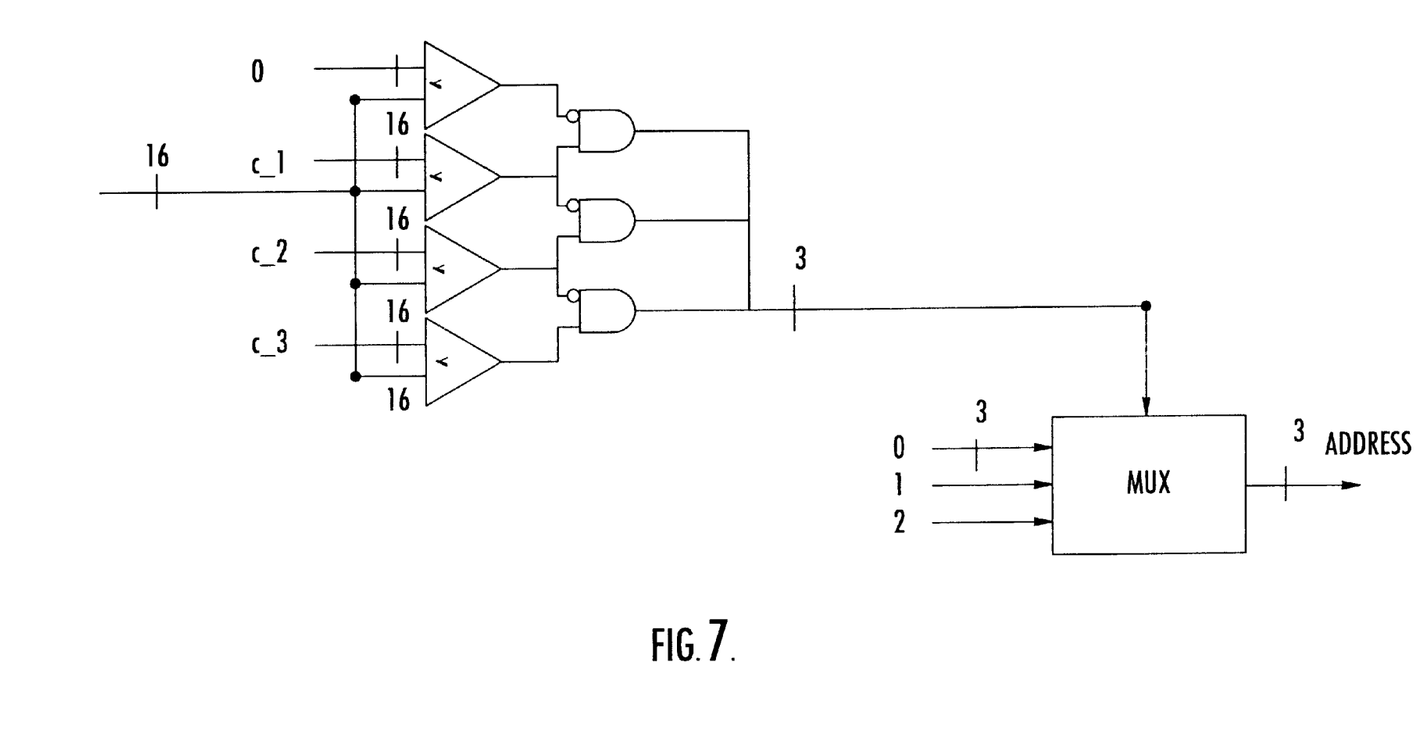
FIG. 7 shows the diagram of the block "comparator of M.A.E." for addressing the ROM contained in the diagram of FIG. 8, according to the present invention.

The outputs of the operators feed a block that calculates the minimum value. The block then outputs the minimum value, which is also called MAE (Mean Absolute Error). With reference to the scheme of FIG. 7, the MAE must be included in one of the three subsets comprising the values:

| |
|---|
| 0 ÷ c_1 |
| c_1 ÷ c_2 |
| c_2 ÷ c_3 |

Figure 8:
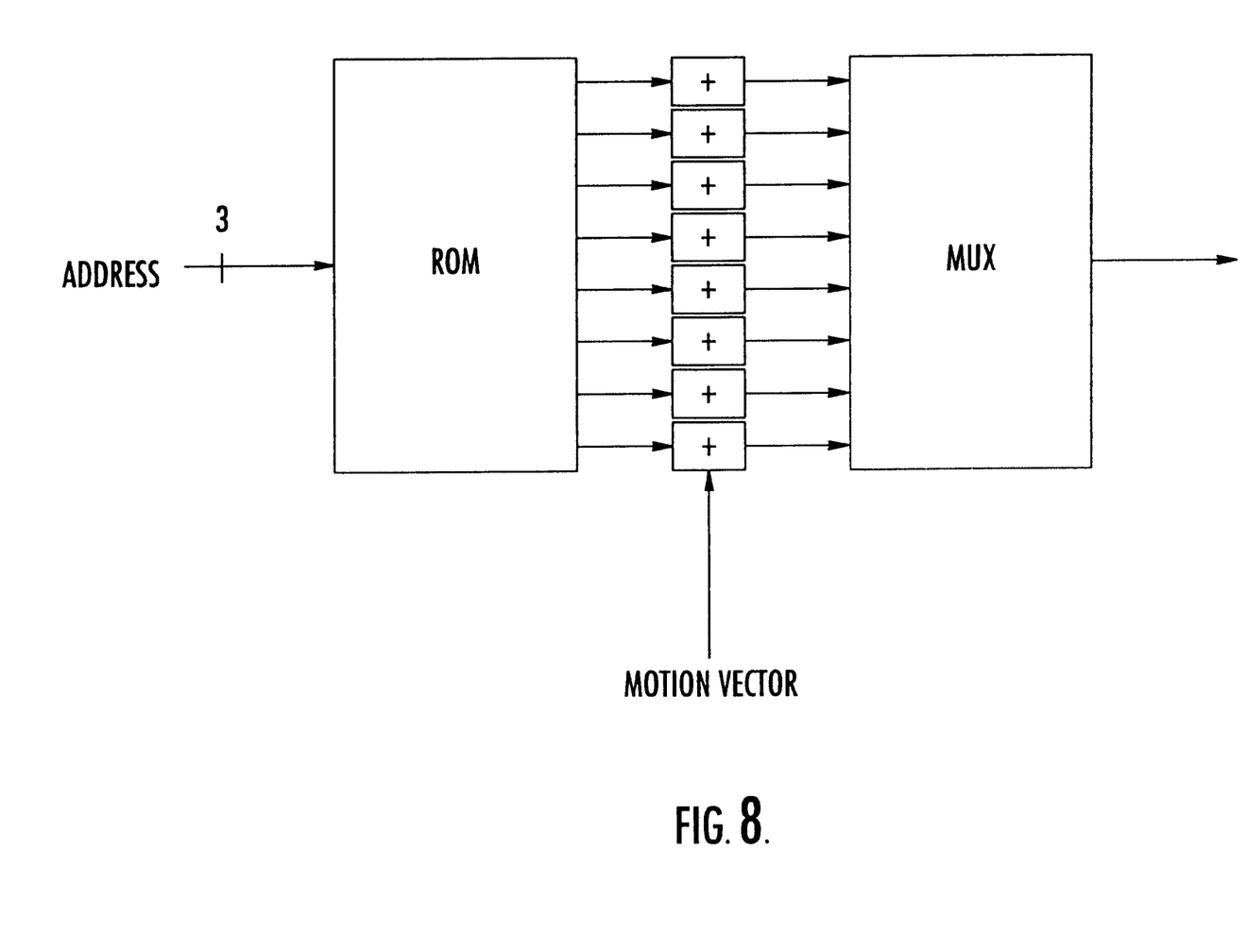
FIG. 8 is the diagram of the block "random addressing of macroblocks", according to the present invention.

As a consequence, an address of the ROM contained in the block of FIG. 8 is provided at the output. The address produced by the block of FIG. 7 addresses a ROM which outputs 8 addresses called "motion vectors". They are to be summed to the motion vector defined above. These sums are multiplexed for addressing the "macroblocks memory".

The embodiments and applications of the motion estimator of the invention are numerous. Among these the following can be mentioned. The motion estimation may be implemented by extracting predictors from a temporally preceding picture, and also from a temporally successive picture. If both estimations are implemented in parallel, replicas of the structure of FIG. 8 operating in parallel may be used. The use of replicas of the motion vector memory and of the macroblocks memory is also applicable. Other embodiments and applications include coders for recording on digital video disks, i.e., DVD RAM, camcorders, and digital coders not based on the MPEG-2 standard, where a phase of motion estimation is required.

That which is claimed is:

1. A method of motion estimation from common fields or pictures of successive images for video coders, the method comprising the steps of:

dividing each picture of N lines and M columns to be subjected to motion estimation into a plurality of (N/R)*(M/S) reference macroblocks, each comprising R lines and S columns of pixels;

defining for each of the reference macroblocks a set of P+Q+2*D predictor macroblocks comprising at least a component between a luminance and a chrominance component disposed on a preceding picture, and wherein 1) P predictors are generated by the use of motion vectors associated to macroblocks preceding the reference macroblocks on the same picture according to a raster scanning, by projecting vectors on the macroblock common to the reference macroblock and disposed on the preceding picture, 2) Q predictors are generated by the use of motion vectors associated to macroblocks following the reference macroblock on the preceding picture according to a raster scanning, by projecting vectors on the macroblock common to the reference macroblock placed on the preceding picture, 3) 2*F predictors are generated by the use of the motion vectors associated to P and Q predictor macroblocks as defined above and summed to integer and/or fraction quantities predefined in look-up tables, 4) calculating per each pair of macroblocks comprising only one among the P or Q or 2*F predictors and the reference macroblock, an L1 norm, the L1 norm being the sum of the differences in absolute values between common pixels belonging to the pairs of macroblocks, 5) identifying a minimum value of the L1 norms and calculating x and y components of the motion vector associated to the reference macroblock as the difference between the common coordinates of a first pixel, according to a raster scanning of the reference macroblock, and the predictor with minimum distortion; and employing a recursive procedure based on a correlation existing among motion vectors associated to macroblocks adjacent to the reference macroblock during the processing of a picture to reduce a total number of operations by:

storing the motion vectors associated to all the macroblocks of a picture, overwriting them one by one with the motion vectors associated to corresponding macroblocks of a following picture during the processing thereof, and as the motion vectors are calculated in succession following a raster type of scanning of the macroblocks, and using the stored motion vectors already calculated, associated to the P macroblocks and the stored motion vectors associated to the Q macroblocks, noncommon to the P macroblocks adjacent to the reference macroblock during the processing of a current picture for addressing P+Q predictor values.

2. A method according to claim 1, further comprising the steps of:

identifying a predictor macroblock with minimum distortion among the P+Q predictor values;

comparing an L1 norm value associated to the minimum distortion predictor with a plurality of T precalculated thresholds, derived from statistical considerations, identifying a plurality of F pairs of vectors, each pair comprising vectors having components of identical absolute value but of opposite sign;

summing the pairs of vectors to a vector associated to the minimum distortion predictor, identifying a plurality of 2*F predictors, double in respect to the number of the pairs of vectors, by including intermediate or sub-pixel positions;

calculating the L1 norm value for each pair of macroblocks comprising one predictor macroblock belonging to a 2*F set and the reference macroblock;

identifying the minimum distortion macroblock among all the 2*F macroblocks; and calculating the motion vector based upon the P predictors generated by the use of motion vectors associated to macroblocks preceding the reference macroblocks on the same picture according to a raster scanning, by projecting vectors on the macroblock common to the reference macroblock and disposed on the preceding picture.

3. A method according to claim 1, further comprising the step of calculating the L1 norm value from a result obtained by subsampling the macroblock according to a quincux grid.

4. A method according to claim 1, further comprising the step of calculating the L1 norm value by interpolating pixels of the predictor by generating a new predictor in a sub-pixel position with respect to a plurality of positions associated to the preceding picture.

5. A method according to claim 1, wherein the video coder conforms to the MPEG-2 standard.

6. A method of motion estimation in accordance with a predetermined standard, the method comprising:

dividing each picture of N lines and M columns to be subjected to motion estimation into a plurality of (N/R)*(M/S) reference macroblocks, each comprising R lines and S columns of pixels;

defining for each of the reference macroblocks a set of predictor macroblocks; and employing a recursive procedure based on a correlation existing among motion vectors associated to macroblocks adjacent to a reference macroblock during processing of a picture to reduce a total number of operations by:

storing the motion vectors associated to all the macroblocks of a picture, overwriting them one by one with the motion vectors associated to corresponding macroblocks of a following picture during processing thereof, and as the motion vectors are calculated in succession following a raster type of scanning of the macroblocks, and using stored motion vectors already calculated, associated to P macroblocks and stored motion vectors associated to Q macroblocks, noncommon to the P macroblocks adjacent to the reference macroblock during the processing of a current picture for addressing P+Q predictor values.

7. A method according to claim 6, further comprising the steps of:

identifying a predictor macroblock with minimum distortion among the P+Q predictor values;

comparing an L1 norm value associated to the minimum distortion predictor with a plurality of T precalculated thresholds, derived from statistical considerations, identifying a plurality of F pairs of vectors, each pair comprising vectors having components of identical absolute value but of opposite sign;

summing the pairs of vectors to a vector associated to the minimum distortion predictor, identifying a plurality of 2*F predictors, double in respect to the number of the pairs of vectors, by including intermediate or sub-pixel positions;

calculating an L1 norm value for each pair of macroblocks comprising one predictor macroblock belonging to a 2*F set and the reference macroblock;

identifying the minimum distortion macroblock among all the 2*F macroblocks; and calculating the motion vector based upon the P predictors generated by the use of motion vectors associated to macroblocks preceding the reference macroblocks on the same picture according to a raster scanning, by projecting vectors on the macroblock common to the reference macroblock and disposed on the preceding picture.

8. A method according to claim 6, further comprising the step of calculating the L1 norm value from a result obtained by subsampling the macroblock according to a quincux grid.

9. A method according to claim 6, further comprising the step of calculating the L1 norm value by interpolating pixels of the predictor by generating a new predictor in a sub-pixel position with respect to a plurality of positions associated to the preceding picture.

10. A method according to claim 6, wherein the predetermined standard is in accordance with an MPEG-2 standard.

11. A method according to claim 6, wherein generation of the motion vector is applicable to an SPML compressed video sequence of a PAL type.

12. A method according to claim 6, wherein generation of the motion vector is applicable to an SPML compressed video sequence of an NTSC type.

13. A recursive motion estimator for generating a motion vector storable in an output register, the recursive motion estimator comprising:

a first memory comprising (N/R)*(M/S) vectors of motion associated to all macroblocks in which a whole picture is divided, and overwritten continuously with values successively calculated for macroblocks of a current picture;

a second memory comprising pixels of a preceding whole picture and of the current picture being processed;

a third memory of macroblocks for storing predictors relative to at least P+Q+2*F macroblocks, even non-adjacent to a reference macroblock being processed, and addressable by vectors selected in said first memory;

a subsampling block for sequentially receiving the predictor values of the P+Q+2*F macroblocks provided by said third memory, and with pixel values of the reference macroblock;

a calculation block for an L1 norm value for calculating a distortion between the reference macroblock and the P+Q+2*F predictor macroblocks;

a comparator for outputting the minimum value of the L1 norm values provided by said calculation block;

a fourth read-only memory addressed by said comparator block for providing individual addresses of the predictors for a plurality of macroblock predictors equal in number to P and/or Q and/or 2*F existing in said third memory; and means for processing the predictors and producing a prediction error datum.

14. A recursive motion estimator according to claim 13, wherein generation of the motion vector is in accordance with an MPEG-2 video coder.

15. A recursive motion estimator according to claim 13, wherein generation of the motion vector is applicable to an SPML compressed video sequence of a PAL type.

16. A recursive motion estimator according to claim 13, wherein generation of the motion vector is applicable to an SPML compressed video sequence of a NTSC type.

* * * * *

UNITED STATES PATENT AND TRADEMARK OFFICE
CERTIFICATE OF CORRECTION

PATENT NO. : 6,456,659 B1  Page 1 of 1
DATED : September 24, 2002
INVENTOR(S) : Amedeo Zuccaro, Danilo Pau and Emiliano Piccinelli It is certified that error appears in the above-identified patent and that said Letters Patent is hereby corrected as shown below:

Title page,
Item [56], U.S. PATENT DOCUMENTS, delete "6,278,736 B1 * 2/2001 De Haan"
insert -- 6,278,736 B1 * 8/2001 De Haan ......... 375/240.16 --; and insert
-- FOREIGN PATENT DOCUMENTS
2307135A 5/1997 (UK) --

Column 5,
Line 51, delete "estimator" insert -- estimator. --

Signed and Sealed this

Twenty-fourth Day of June, 2003

JAMES E. ROGAN
*Director of the United States Patent and Trademark Office*